United States Patent
Kanamaru et al.

(10) Patent No.: US 6,622,206 B1
(45) Date of Patent: Sep. 16, 2003

(54) METHOD FOR CONTROLLING WRITE CACHE TRANSFER AND DISK UNIT

(75) Inventors: Atsushi Kanamaru, Sagamihara (JP); Hideo Asano, Machida (JP); Tetsuo Ueda, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 09/591,020

(22) Filed: Jun. 9, 2000

(30) Foreign Application Priority Data

Jun. 11, 1999 (JP) .......................................... 11-165696

(51) Int. Cl.[7] .............................................. G06F 12/00
(52) U.S. Cl. ..................... 711/113; 710/56; 711/171; 711/201
(58) Field of Search ................. 711/112, 113, 711/114, 171, 172, 201; 710/56, 52

(56) References Cited

U.S. PATENT DOCUMENTS

| | | | | |
|---|---|---|---|---|
| 5,046,039 A | * | 9/1991 | Ugajin et al. ................. | 710/56 |
| 5,778,420 A | * | 7/1998 | Shitara et al. ............... | 711/113 |
| 5,880,855 A | * | 3/1999 | Ishikawa ..................... | 358/404 |
| 5,920,732 A | * | 7/1999 | Riddle ......................... | 710/56 |
| 6,009,108 A | * | 12/1999 | Takehara et al. ............. | 370/538 |
| 6,226,290 B1 | * | 5/2001 | Salett et al. ................. | 370/389 |
| 6,275,896 B1 | * | 8/2001 | Kojima ........................ | 711/112 |

FOREIGN PATENT DOCUMENTS

| | | |
|---|---|---|
| JP | 51-71749 | 6/1976 |
| JP | 05-210462 | 8/1993 |
| JP | 06-180635 | 6/1994 |
| JP | 06-195301 | 7/1994 |
| JP | 08-152973 | 6/1996 |

* cited by examiner

*Primary Examiner*—Pierre-Michel Bataille
(74) *Attorney, Agent, or Firm*—Robert B. Martin; Bracewell & Patterson, L.L.P.

(57) ABSTRACT

A method and system are disclosed to prevent significant degradation of a data transfer rate in write cache transfer, thereby keeping the minimum data transfer rate high. The initial value $T_i$ of the virtual buffer full capacity $T(t_x)$ is set to F/N (where F is a data capacity of the buffer, and N>1) and it is determined if the amount of write cached data $S(t_x)$ reaches the virtual buffer full capacity $T(t_x)$ so that write cache transfer is enabled during an $S(t_x)<T(t_x)$ period and if virtual buffer full ($S(t_x)=T(t_x)$) is satisfied, the write cache transfer is inhibited until $S(t_x)<T(t_x)$ is satisfied and the virtual buffer full capacity $T(t_x)$ is increased by a predetermined value K from the current one each time disk writing is stopped (each time a write error occurs) while the virtual buffer full is continued, thereby enabling write cache transfer while disk writing is stopped.

14 Claims, 9 Drawing Sheets

Figure 4

| Buffer address | Logical address | W/R | Recording status |
|---|---|---|---|
| 0 0 1 | 0 0 0 1 0 | W | C |
| 0 0 2 | 0 0 0 1 1 | W | C |
| 0 0 3 | 0 0 0 1 2 | W | NC |
| 0 0 4 | 0 0 0 1 3 | W | NC |
| 0 0 5 | 0 1 0 0 1 | R | C |
| 0 0 6 | 0 1 0 0 2 | R | C |
| 0 0 7 | 0 1 0 0 3 | R | C |

METHOD FOR CONTROLLING WRITE CACHE TRANSFER AND DISK UNIT

BACKGROUND OF THE INVENTION

1. Technical Field

The present invention relates to a method for controlling write cache transfer for sequentially transferring a unit of data from outside of a storage device to a write cache buffer provided in the storage device, which is, for example, a disk unit provided with a write cache function (a cache used for storing transferred data requested to be written on a recording medium), as well as a disk unit provided with a write cache function, realized by employing this controlling method.

2. Description of the Related Art

Data to be written on a medium (recording medium) in a storage device is usually transferred from a host system with use of a transfer procedure to be described below. At first, the host system transmits a write command to the storage device, then a start logical address of an area on the medium to be written with data, and then a data length (a unit of data) to be transferred according to the write command. After this, the host system transfers the unit of data sequentially in response to each data transfer request from the storage device. The storage device, after receiving the write command, requests that the host system transfer the unit of data. Each time the storage device receives the unit of data, it requests the next transfer of data sequentially. When receiving the whole data to be transferred with one write command, the storage device notifies the host system of the completion of the write command. A unit of data transferred with one write command, for example, to a hard disk drive (HDD), is one sector in minimum (1 sector: 512 bytes) and 256 sectors in maximum. The unit of data described above is, for example, one sector. The host system cannot transfer the next data until receiving the next data transfer request from the storage device. On the other hand, the host system cannot transmit the next write command until being notified of completion of the last write command. To transfer a series of data over the above unit, the host system repeats a sequence consisting of a data transfer request and a unit of data transfer, thereby transferring a series of unit data sequentially after transmitting a write command. And, to transfer a series of data over the maximum unit of data to be transferred with one write command, the host system repeats a sequence consisting of transmission of a write command, data transfer, and notification of completion of the write command, thereby transferring a series of unit data sequentially.

Some of the storage devices including the hard disk drive (HDD) are provided with a cache buffer respectively. And, it is now common that such a storage device provided with a cache buffer is also provided with not only a read cache function but also a write cache function.

A write cache is used to cache data transferred from a host system in the buffer before the data is written on a medium. In this specification, data transfer between a host system and a buffer with use of a write cache is referred to as "write cache transfer". On the other hand, a read cache is used to cache data read from a medium in the buffer before the data is transferred to the host system.

A storage device, if it is not provided with a cache buffer, writes transferred data on a medium, then requests that the host system transfer the next data. In a write cache transfer operation, the storage device requests that the host system transfer the next data just after completing caching of transferred data in the buffer; it does not await completion of the writing of cached data on the medium.

It takes much time to write data on a medium. In the case of a hard disk drive (HDD), data must be written in an object sector on the surface of a disk therein by seeking an object track, positioning the head on the track, then awaiting a rotational latency until the head passes over the target sector. Because the hard disk unit can request the host system for transfer of the next data before completing the writing of data on the medium with use of a write cache, it is possible to reduce the time required until the storage device requests the host system for the next transfer of a unit of data after receiving the unit of data from the host system, thereby the data transfer rate can be increased more between the host system and the storage device.

Because of a recent trend that storage devices including the HDD are getting larger and larger in capacity and faster and faster in operation speed, it is accordingly required that those storage devices are used to store such data as dynamic picture images, etc. handled by AV (Audio/Visual) application programs. A series of data handled in an AV application program is often larger than the data capacity of a cache buffer. And, to transfer a series of mass data larger than the data capacity of such a buffer sequentially with use of a write cache, the data transfer rate used between the host system and the buffer is faster than the data transfer rate (write speed) between the buffer and the disk. Therefore, the buffer often becomes full with write cached data during the write cache transfer.

To transfer a series of such data sequentially with use of a write cache, therefore, the storage device requests the host system for transferring the next data immediately after completing receiving of a unit of data until the buffer becomes full. After this, however, if the buffer becomes full, the storage device requests the next transfer of a unit of data after the buffer secures a space enough to cache the transferred data due to the writing on a medium.

In the case of the conventional write cache transfer operation, data is transferred at a high data transfer rate conforming to the transfer rate between the host system and the buffer until the buffer becomes full. After the buffer becomes full, however, the data transfer rate is lowered conforming to the data transfer rate for writing data on a medium (the data transfer rate between the buffer and the medium).

In the case of the conventional write cache transfer, if a write error occurs while the buffer is full with data, the buffer cannot make an empty space until the error is recovered. In addition, the host system is not notified of the completion of receiving, thereby the write cache transfer is stopped until the error is recovered. The data transfer rate is thus degraded significantly. Consequently, the data transfer rate, which is a transfer rate per unit of data, is lowered more and more as the time required until it is requested to transfer the next data gets longer. Otherwise, the data transfer rate, which is a transfer rate per write command, is lowered more and more as the time required between transmission of a write command and notification of the completion of the write command gets longer and longer.

Because an AV application program as described above transfers a series of mass data sequentially, it is often requested to guarantee the minimum value of the data transfer rate. In the conventional write cache transfer, however, if a write error occurs, the data transfer rate is degraded significantly, thereby it is difficult to meet such a request for assuring the minimum value of the data transfer rate.

As described above, therefore, the conventional write cache transfer has been confronted with a problem that the minimum value of the data transfer rate must be kept high.

SUMMARY OF THE INVENTION

It is an object of the present invention to provide a method for preventing such significant degradation of a data transfer rate, as well as maintaining the minimum data transfer rate at a higher rate.

In order to achieve the above object, the write cache transfer controlling method of the present invention comprises the steps of:

[A] setting an initial value $T_i$ of a virtual buffer full capacity T to F/N (where F is a data capacity of the buffer, and N>1);

[B] determining if an amount of write cached data S, which is increased by write cache transfer and decreased by writing the transferred data on the recording medium, reaches the virtual buffer full capacity T; and

[C] setting the transfer rate of a unit of data lower while the amount of write cached data S reaches the initial value $T_i$ of the virtual buffer full capacity ($S \geq T_i$) than that while the amount of write cached data S does not reach the initial value $T_i$ of the virtual buffer full capacity ($S < T_i$)

More specifically, in the step of [C], the data transfer is enabled during an S<T period. And, when the virtual buffer becomes full (S=T), the data transfer is inhibited until S<T is satisfied. And, while the virtual buffer is full with data, the virtual buffer full capacity is reset to a larger value each time writing of the write cached data is stopped.

Further, more specifically, in the step of [C], while the amount of write cached data S does not reach the initial value $T_i$ of the virtual buffer full capacity, a unit of data is transferred continuously. While the amount of write cached data S reaches the initial value $T_i$ of the virtual buffer full capacity, a unit of data is transferred sequentially at certain time intervals.

Furthermore, the disk unit of the present invention comprises a write cache buffer for storing data transferred from outside; a write cache transfer controller for controlling write cache transfer for sequentially transferring a unit of data to the buffer from outside; a disk recording medium written with write cached data from the buffer; data write means for writing the write cached data cyclically in a plurality of sectors in a track on the surface of the disk recording medium; and a write controller for detecting a position of the data write means on the disk recording medium and positioning the data write device on a target track so as to write the cached data on the disk recording medium.

The write cache transfer controller is provided with means for setting an initial value $T_i$ of a virtual buffer full capacity T to F/N (where F is a data capacity of the buffer, and N>1); means for detecting an amount of write cached data S, which is increased by the write cache transfer and decreased by writing the transferred data on the disk recording medium, and determining if this amount of write cached data S reaches the virtual buffer full capacity T; and controlling means for delaying the transfer rate of the unit of data more while the amount of write cached data S reaches the initial value $T_i$ of the virtual buffer full capacity ($S \geq T_i$) than that while the amount of write cached data S does not reach the initial value $T_i$ of the virtual buffer full capacity ($S < T_i$)

More specifically, the controlling means includes a device for enabling the data transfer during an S<T period and inhibiting the data transfer until S<T is satisfied if the virtual buffer becomes full (S=T), as well as means for resetting the virtual buffer full capacity T to a larger value each time writing of the cached data on a disk is stopped while the virtual buffer full is continued.

Further, more specifically, the write controlling means continues writing at the current disk rotation even when a write error occurs in a sector and retries the writing in the error-detected sector at the next disk rotation.

Further, more specifically, the controlling means transfers a unit of data sequentially and continuously while the amount of write cached data S does not reach the initial value $T_i$ of the virtual buffer full capacity and transfers a unit of data sequentially at certain time intervals while the amount of write cached data S reaches the initial value $T_i$ of the virtual buffer full capacity.

BRIEF DESCRIPTION OF THE DRAWINGS

FIG. 4 shows a structure of a cache table;

DETAILED DESCRIPTION OF A PREFERRED EMBODIMENT

Figure 1:
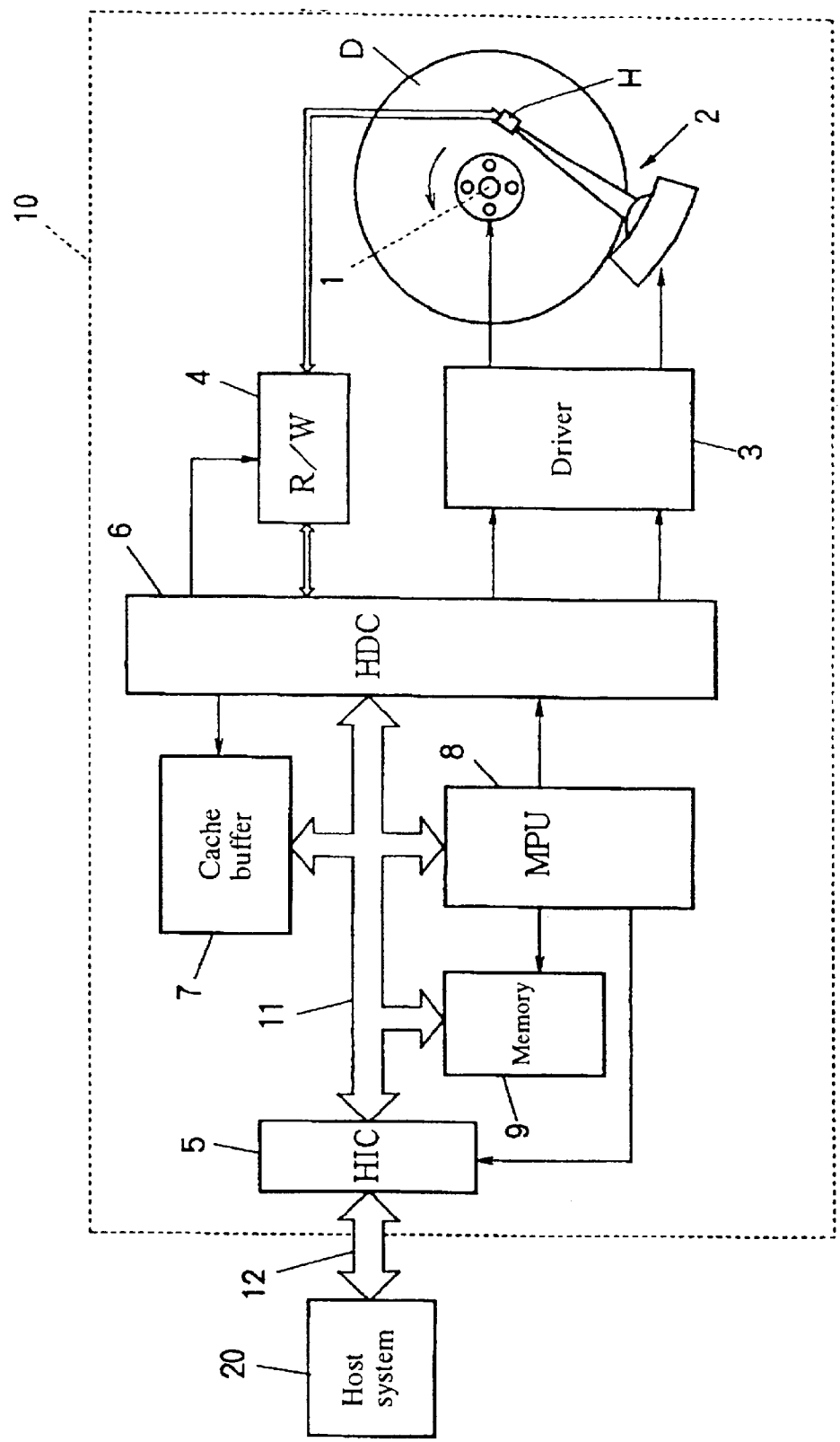
FIG. 1 is a block diagram of a disk unit in the first embodiment of the present invention.

FIG. 1 is a block diagram of a disk unit in the first embodiment of the present invention. The disk unit 10 shown in FIG. 1 comprises a magnetic recording disk (hard disk) D, which is a recording medium; a head H for writing/reading data on/from the disk D, a spindle motor 1 for rotating the disk D; an actuator 2 for supporting the head H and moving the head H in the radial direction of the disk D; a driver module 3 for driving the spindle motor 1 and the actuator 2; a read/write (R/W) channel module 4; a host interface controller (HIC) 5; a hard disk controller (HDC) 6; a cache buffer 7; a micro processing unit (MPU) 8; and a memory 9.

The disk D, the head H, the spindle motor 1, and the actuator 2 are all housed in the housing of the disk unit 10. The driver module 3, the R/W channel module 4, the HIC 5, the HDC 6, the buffer 7, the MPU 8, and the memory 9 are mounted on a card (printed board) so as to compose a card assembly. This card assembly is attached to the outside surface of the housing of the disk unit. The HIC 5, the HDC 6, the buffer 7, the MPU 8, and the memory 9 are connected to each other via a bus 11. The HIC 5 and the host system 20 are also connected to each other via a bus 12.

The magnetic recording disk D consists of one or a plurality of disks, which are all fixed to the shaft of the spindle motor 1. It is premised in this embodiment that the disk D consists of only one disk. The disk D is rotated unitarily with the shaft when the spindle motor 1 is driven by the driver module 3. The head H is mounted at the tip of an arm of the actuator 2 and rotated unitarily with the actuator 2 driven by the driver module 3. The head H is thus moved in the radial direction of the disk D. Data can be recorded on the surfaces DS at both sides of the disk D. The head H is provided for each disk surface DS.

Figure 2:
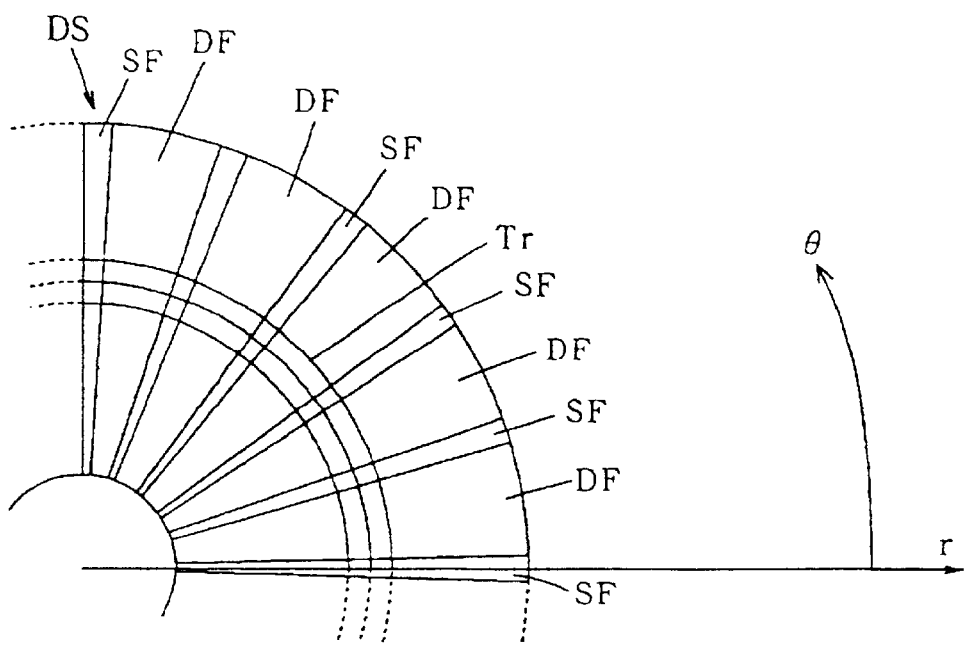
FIG. 2 shows a structure of a disk surface.

FIG. 2 shows a track structure on a disk surface DS.

Figure 3:
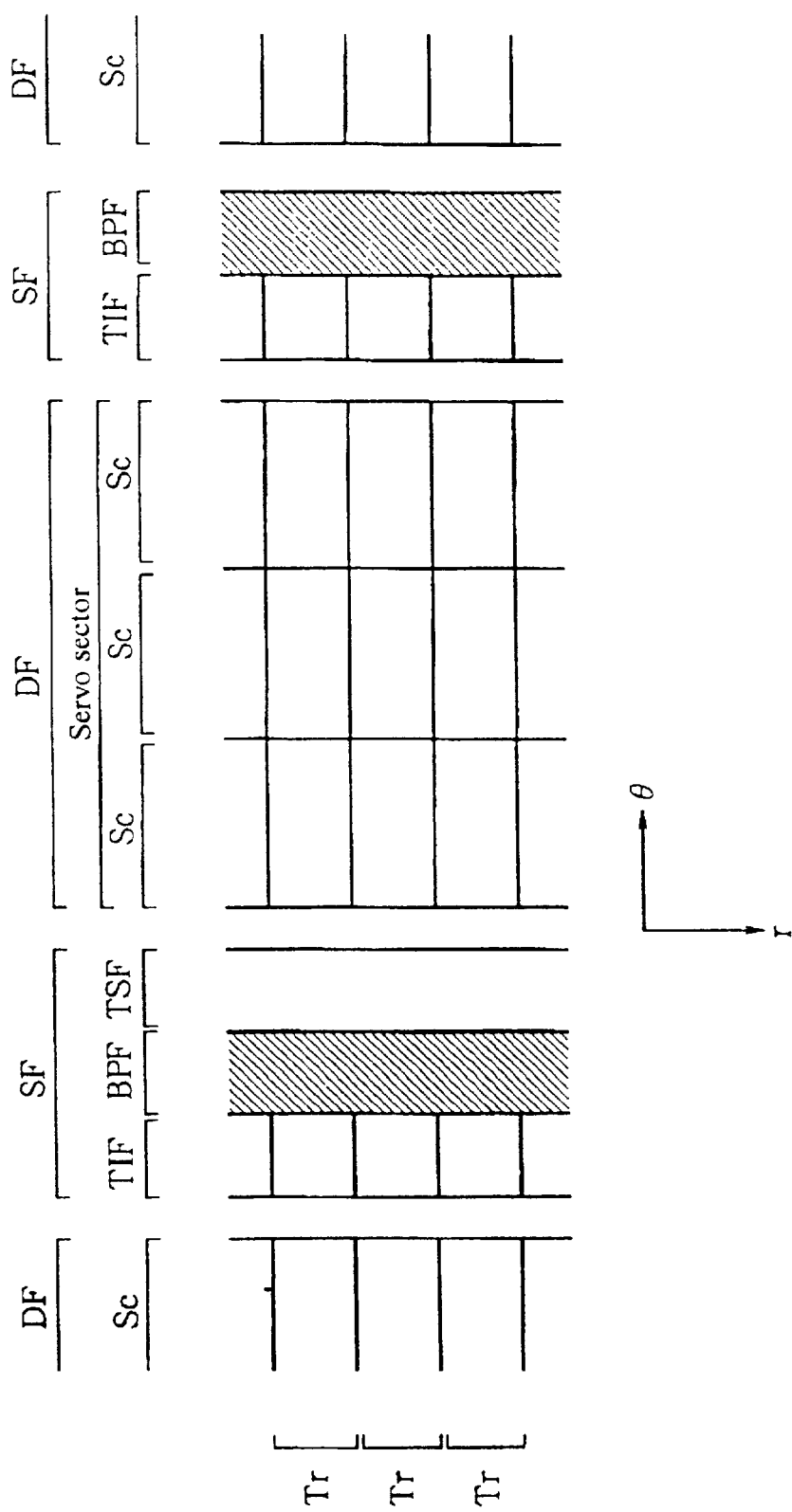
FIG. 3 shows a structure of a track on the disk surface.

FIG. 3 shows a structure of a track on the disk surface DS.

As shown in FIG. 2, the disk surface DS is partitioned into data fields DF in which data is recorded respectively, and servo fields SF. A plurality of servo fields SF are formed in a radial pattern in the radial direction of the disk. A data field DF is formed between servo fields. On a disk surface DS are formed, for example, 80 servo fields SF. A disk surface DS are partitioned into many tracks Tr in a concentric pattern.

As shown in FIG. 3, a data field DF in each track Tr is partitioned into many data sectors Sc. These sectors Sc are disposed in the length direction of the track Tr. Each of those data sectors Sc records data transferred from the host system 20. The data capacity to be recorded in one data sector Sc is, for example, 512 bytes ($=2\times 16^2$ bytes)

A side identification number i ($=0,1$) is given to each disk surface DS of a disk D. The disk surface specified with a side identification number i is represented as DS(i) and the head provided for the disk surface DS(i) is represented as H(i). And, a track identification number j (j=0, 1, 2 . . . ) is given to each track Tr on the disk surface DS(i). A track specified with a track identification number j is represented as Tr(j). The same track identification number is given to the tracks Tr disposed on the same radius of both disk surfaces DS(0) and DS(1) of a disk. Furthermore, a sector identification number k (k=1, 2, 3 . . . ) is given to each sector Sc in the track Tr(j). A sector specified with a sector identification number k is represented as Sc(k). The number of data sectors in a track is, for example, 200 to 400.

In each track Tr are disposed a few data sectors Sc (three sectors in FIG. 3) between a servo field SF and the next servo field SF. A sector consisting of those few data sectors Sc disposed between servo fields is referred to as a servo sector.

A logical address a (a: a given decimal code) is given to each data sector Sc on each disk D. However, no logical address is given to a fault sector and a sector prepared for an alternative processing. A sector specified with a logical address a in the disk unit 10 is represented as Sc[a]. A logical address a is given so that the host system 20 identifies a sector Sc from others on a disk D. One logical address a corresponds to a set of a side identification number i, a track identification number j, and a sector identification number k.

In each servo field SF on a disk surface DS are formed a track identification number area TIF and a burst pattern recording area BPF. In any one of servo fields SF on a disk surface DS is also formed a track start pattern recording area TSF.

In the track identification number area TIF in each track Tr is recorded the track identification number j with use of a gray code (cyclical decimal code). In addition, in the burst pattern recording area BPF is recorded a burst pattern. And, in the track start pattern recording area TSF is formed a track start pattern extended in the radial direction of the disk (or a track start code having the same value is recorded in each track Tr). This track start pattern is formed at the start position of each track.

The host system 20 requests the disk unit 10 to write data on a disk D by transmitting a write command thereto, then transmits the start logical address of the sector Sc to be written with data and a transfer data length to the disk unit 10. After this, the host system transfers a unit of data (for example, a sector of data) sequentially to the disk unit 10 each time a data transfer request is issued therefrom. Receiving a write command, the disk unit 10 requests the host system 20 for data transfer and caches a unit of data transferred in response to this request in the buffer 7. Completing the write caching, the disk unit requests the host system for the next data transfer and writes the write cached data on the disk D (write command processing). Receiving a data transfer request, the host system 20 transfers the next unit of data immediately. The disk unit 10, completing receiving of the entire data transferred in response to the write command, notifies the host system 20 of completion of the write command.

Furthermore, the host system 20 transmits a read command to the disk unit 10, thereby requesting the disk unit 10 to read data from the disk D, then transfers the start logical address of a target sector to the disk unit 10. Receiving the read command, the disk unit 10 determines if the requested data is cached in the buffer 7. If not cached, the disk unit 10 reads data from the disk D and caches the data in the buffer 7 so that the cached data is transferred from the buffer 7 to the host system 20 (read command processing).

The buffer 7 is a fast accessable memory for enabling data transferred from the host system 20 to be write-cached and data read from a disk D to be read-cached. This buffer 7 is, for example, a DRAM of $F=2\times 16^5$ bytes in capacity. In this case, the buffer 7 can cache data of $16^3$ sectors Sc in maximum. The write cached data in the buffer 7 is transferred to the R/W channel module 4 by the HDC 6.

The R/W channel module 4 selects an R/W channel used for a head H and converts write cached data from the buffer 7 to analog signals, then enters the analog signals into the selected R/W channel. The write cached data is written in sectors Sc on the disk surface DS(i) by a write element of the head H(i) of the selected R/W channel.

The R/W channel module 4 shapes and amplifies read signals from the disk surface DS(i) with use of the read element of the head H(i) of the selected R/W channel, then transfers the shaped signals to the HDC 6. The above read signals include read signals of data written in sectors Sc, as well as a sync code read signal, a gray code (track identification number j) read signal, a burst pattern read signal, and a track start pattern read signal. Data read from sectors Sc is transferred to the buffer 7 by the HDC 6 so as to be read-cached there.

The memory 9 stores a control program to be executed by the MPU 8, data, parameters, tables, etc. used by the MPU 8 to control the disk unit 10. The control program is stored in a non-volatile area provided in the memory 9. The control program may also be recorded in a special area secured beforehand on a disk surface DS, so that it is read into the non-volatile area of the memory 9 from the area on the disk surface DS when the disk unit 10 is activated.

The MPU 8 controls both HIC 5 and HDC 6 under the control of the control program stored in the memory 9 so as to enable both write and read commands to be executed. The HIC 5 receives data (a write command, the start logical address of a write sector, a data length, a unit of write data to be transferred, a read command, the start logical address of a read sector, etc.) transferred from the host system 20 according to the commands from the MPU 8 and transfers the data (a unit data transfer request, a notice of write command completion, read cached data, etc.) to the host system 20. The HDC 6 controls the driver module 3, the R/W channel module 4, and the buffer 7 according to the commands from the MPU 8.

The HDC 6 or MPU 8 is provided with registers used to hold a cache table, etc. The cache table is used to correlate each address in the buffer 7 (a buffer address) with a logical address in/from which data cached in each buffer address is to be written or having been written/read.

FIG. 4 shows a structure of the cache table. In the cache table shown in FIG. 4, each buffer address is provided with a field written with a corresponding logical address, a field written with a flag (W: write cache, R: read cache) for identifying data if it is write cached data or read cached data, a field written with a flag (C: write cached data or read cached data recorded on a disk, NC: write cached data whose writing is not completed on a disk) for identifying data if it is cached data recorded on a disk D. Data of one sector Sc is cached in one buffer address. For a write cache, in the logical address field is written a logical address found according to the start logical address of a write sector and a length of write data transferred from the host system 20.

The HIC 5, the HDC 6, and the MPU 8 are combined to compose a write cache transfer controller. This write cache transfer controller transfers data to be written on a disk D to the buffer 7 from the host system 20 and controls the write cache transfer of data to be write-cached in the buffer 7.

The MPU 8 and the HDC 6 are combined to compose a disk access controller. This disk access controller controls disk access so as to access a target sector $Sc[a_T]$ on a disk D and write cached data in the target sector $Sc[a_T]$ or read data from the target sector $Sc[a_T]$ and read-cache the data in the buffer 7.

The HIC 5, the HDC 6, and the MPU 8 are combined to compose a read cache transfer controller. This read cache transfer controller controls read cache transfer for sequentially transferring read cached data from the buffer 7 to the host system 20.

The disk access controller controls disk access in the following procedure:

(a) converts the logical address $a_T$ (written in the logical address field in the cache table) of a target sector to a side identification number $i_T$, a track identification number $j_T$, and a sector identification number $k_T$;

(b) changes an R/W channel to a channel used for the head $H(i_T)$ provided on a target disk surface $DS(i_T)$;

(c) seeks a target track $Tr(j_T)$ and positions the head $H(i_T)$ at a target position in the width direction in the target track $Tr(i_T)$ so that the head $H(i_T)$ follows up with the track Tr $(i_T)$;

(d) instructs the head $H(i_T)$ to write cached data in the target sector $Sc(k_T)$ for a processing executed by a write command; and (e) instructs the head $H(i_T)$ to read data from the target sector $Sc(k_T)$ so as to be read-cached for a processing executed by a read command.

In the step of (c), the disk access controller generates a positioning error signal (PES) from a burst pattern read signal and detects a position of the head $H(i_T)$ in the width direction of the track (in the radial direction of the disk) according to a gray code (a track identification number) read signal and the PES. The PES is a signal whose value is changed according to the position of the track in the width direction.

The disk access controller seeks a target track $Tr(j_T)$ according to a gray code read signal and positions the head $H(i_T)$ at the target position in the track $Tr(j_T)$ according to the PES so that the head $H(i_T)$ follows up with the track $Tr(j_T)$. Specifically, the controller controls the actuator 2 via the driver module 3 and moves the head $H(i_T)$ to the target position where the gray code of the target track identification number $j_T$ is read, and makes a fine adjustment of the position of the head $H(i_T)$ so that the PES is kept within a target range.

In the step (d) or (e), the head $H(i_T)$ positioned in the track $Tr(j_T)$ can access sectors Sc in the track $Tr(j_T)$ cyclically while it starts at a position in a track and returns there after passing above the start position of the track due to one rotation of the disk D. When passing above the target sector $Sc(k_T)$, the head $H(j_T)$ can access this sector $Sc(k_T)$.

The disk access controller detects a timing of the head $H(i_T)$ for passing the start position of a track according to the signal of the track start pattern TSP read by the head $H(i_T)$ and detects a timing of the head $H(i_T)$ for passing the start position of a sector according to the timing of the sync code read by the head $H(i_T)$. In addition, the disk access controller detects a sector identification number (a logical address) of a sector Sc on which the head $H(i_T)$ is passing according to how much a time elapses from the read timing of the track start pattern TSP.

In the case of a write command processing, the disk access controller references the cache table in the step (d), enables write cached data, which is written in a target sector $Sc(k_T)$, to be transferred to the R/W channel module 4 from the buffer 7 synchronously with the timing for accessing the target sector $Sc(k_T)$ and instructs the head $H(i_T)$ to write this write cached data in the target sector $Sc(k_T)$. Completing the writing, the disk access controller writes a completed record flag C in the record flag field corresponding to the logical address $a_T$ in the cache table. Consequently, the data-written area in the buffer 7 becomes empty (as a rewritable area).

In the case of a read command processing, the disk access controller transfers data read from the target sector $Sc(k_T)$ via the head $H(i_T)$ to the buffer 7 in the step (e) if the data recorded in the target logical address $a_T$ does not make a cache hit (not read-cached), so as to read-cache the data. Then, the disk access controller writes a logical address, a read cache flag R, and a completed record flag C in the logical address field, in the cache flag field, and in the record flag field corresponding to the read cached buffer address in the cache table respectively.

When accessing sectors, a plurality of sectors whose logical addresses are consecutive are usually accessed, not only one sector. In such a case, in the step (d) or (e), data is written or read sequentially and cyclically in/from those target sectors in a target track. Upon completing the writing or reading of data in/from all the sectors, the head is positioned in the next track in the step (c) or in the steps (b) and (c), thereby data is written/read sequentially and cyclically in/from the target sectors in this track.

Furthermore, the disk access controller, when writing write cached data cyclically and sequentially in the target sectors in a target track;

(f) stops the writing if a write error occurs, (g) retries the writing at the next disk rotation, and (h) performs an alternative processing (reassign processing) of the target sectors $Sc(k_T)$ so as to write cached-data in those alternative sectors if the write error is not recovered even in the retried writing.

In the step (f), a write error is a positioning error or an access timing error of the head $H(i_T)$. The write error occurs if the PES value goes out of the target range or if the sync code cannot be read normally. The disk access controller thus monitors both PES and sync code read signal, thereby determining such an error as a positioning error and stopping the writing.

In step of (f) above, to write a series of write cached data in sectors Sc in a track $Tr(j_T)$ sequentially, the disk access controller stops the writing at the current disk rotation if a write error occurs in a servo sector in step of (d) above and restarts the writing at the error-detected servo sector at the next disk rotation.

If the write error recurs in the same servo sector in step of (g), the disk access controller changes the current R/W channel to that used for the head on the disk surface on which an alternative servo sector is provided in the reassign processing in the step of (h). Then, the controller seeks a track having the alternative sectors, then positions the head H on this track Tr so as to write the cached data in those alternative sectors. After this, the controller changes the R/W channel to that used for the head $H(i_T)$ and seeks the track $Tr(j_T)$ so as to position the head $H(i_T)$ on the track $Tr(j_T)$ and restart the writing in the next sector following the reassigned sectors.

The write cache transfer controller controls write cache transfer in the following procedure:

(A) setting an initial value $T_i$ of a virtual buffer full capacity T to F/N (where F is a data capacity of the buffer 7, and N>1);

(B) determining if an amount of write cached data S (an amount of write cached data not written on a disk), which is increased by the write cache transfer and decreased by writing the transferred data on the disk, reaches the virtual buffer full capacity T;

(C) enabling write cache transfer during a S<T period;

(D) inhibiting the write cache transfer until S<T is satisfied if the virtual buffer becomes full (S=T); and (E) resetting the virtual buffer full capacity T to a larger value each time writing of cached data on the disk is stopped while the virtual buffer full is continued (however, writing stop due to a track seek and a head change is excluded here).

In steps (C) to (E) above, the minimum value of the data transfer rate is kept high, since the transfer rate (a transfer rate of a unit of data or per write command) is set lower while the amount of write cached data S reaches the initial value $T_i$ of the virtual buffer full capacity ($S>T_i$) than that while the amount of write cached data S does not reach the initial value $T_i$ of the virtual buffer full capacity ($S<T_i$).

The read cache transfer controller determines if requested data makes a cache hit (the data is read-cached in the buffer 7) by referencing the cache table. If the data is cache hit, the controller transfers the read cached data in the buffer 7 to the host system 20. If no cache hit, the controller instructs the disk access controller to access the disk D to read the data and transfer the read cached data in the buffer 7 to the host system 20.

Next, a description will be made in detail of how the disk unit 10 controls write cache transfer.

Figure 5:
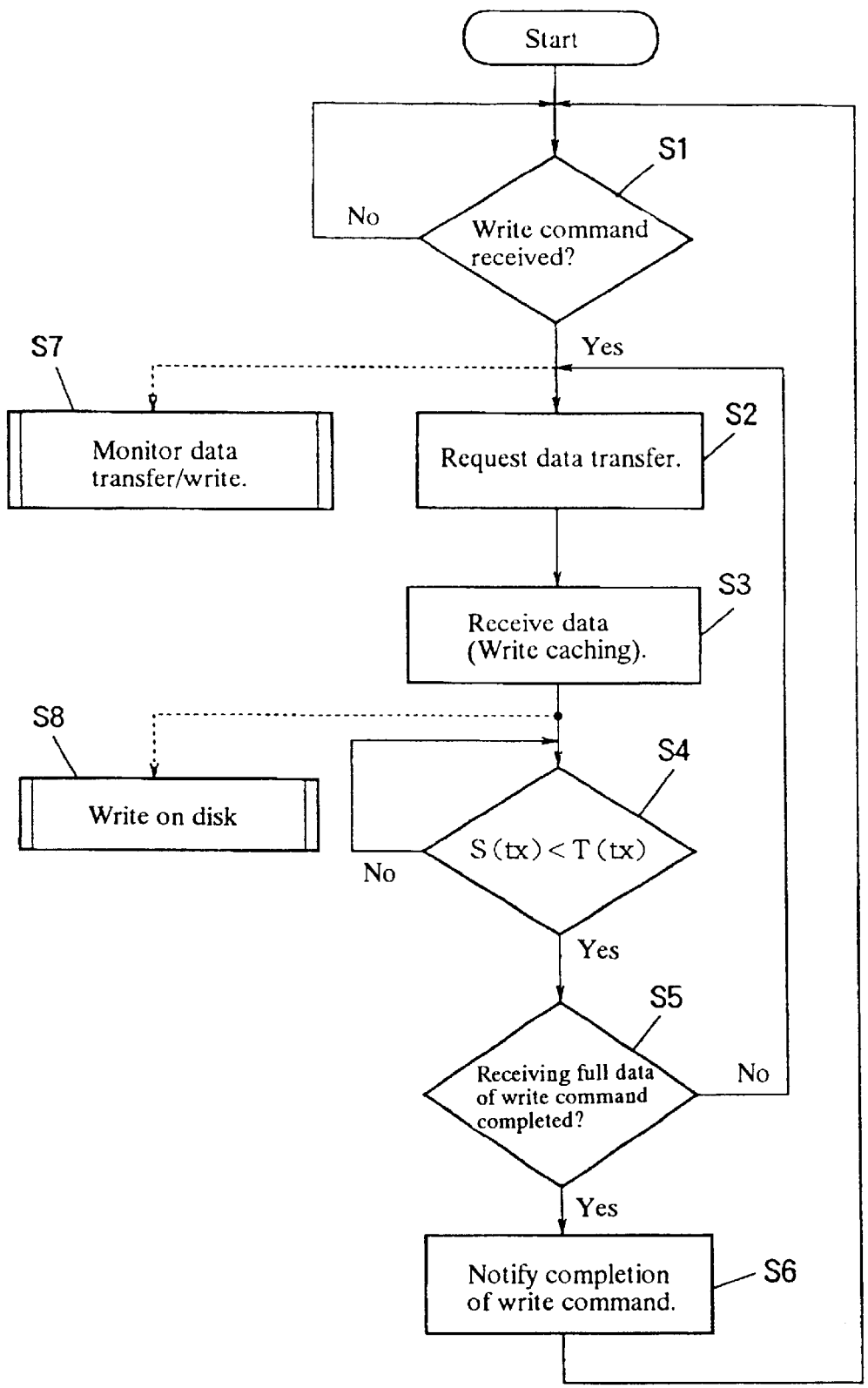
FIG. 5 is a flowchart of a controlling procedure for write cache transfer of the disk unit in the first embodiment of the present invention.

FIG. 5 is a flowchart of a controlling procedure for write cache transfer of the disk unit 10.

Figure 6:
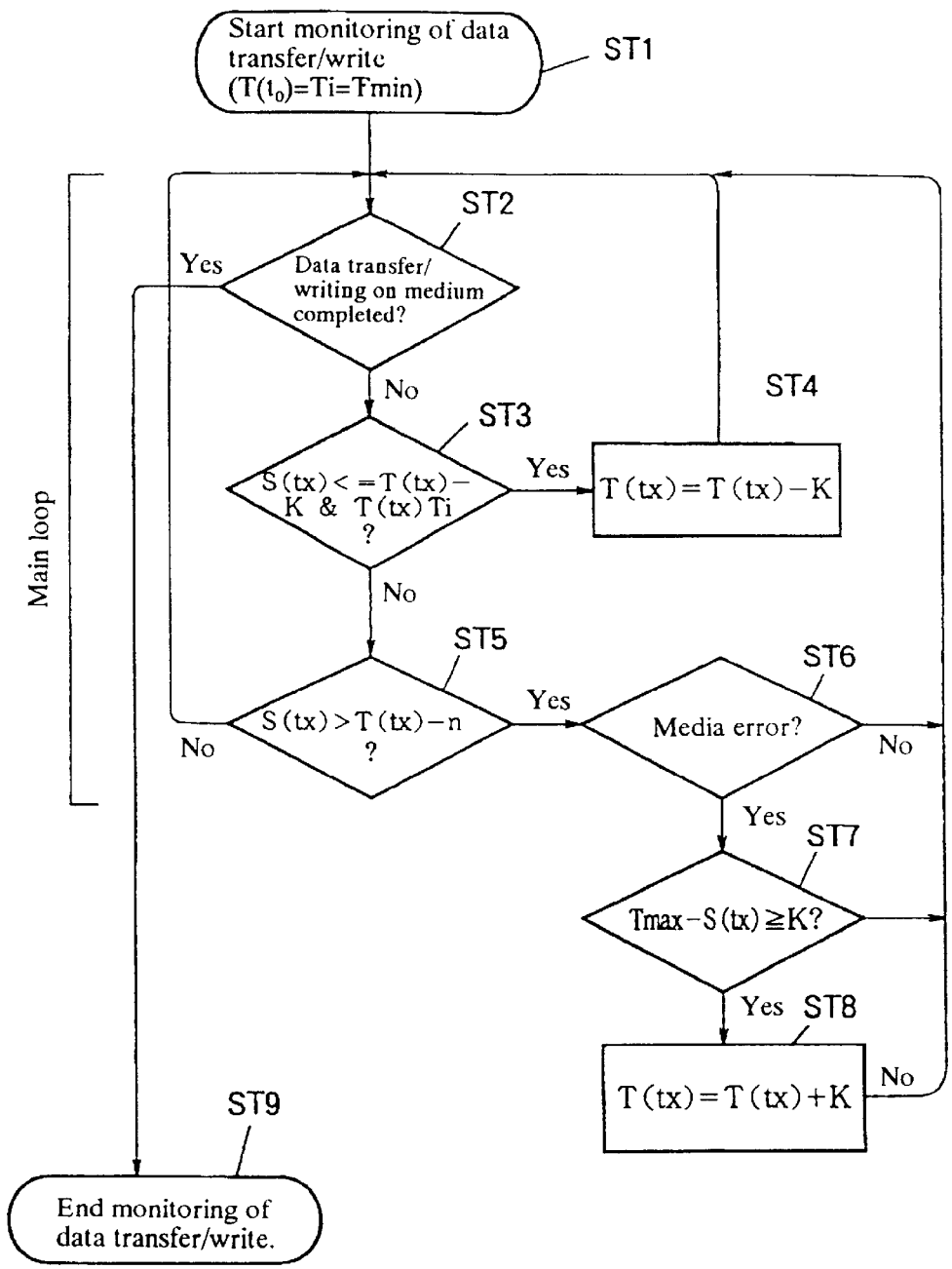
FIG. 6 is a flowchart of a data transfer/write monitoring procedure included in the write cache transfer controlling procedure shown in FIG. 5.

FIG. 6 is a flowchart of a procedure for monitoring a data transfer/write processing included in the write cache transfer controlling procedure.

In FIGS. 5 and 6, $T(t_x)$ is a virtual buffer full capacity T at a time $t_x$. $T_{min}$ is an initial value of the virtual buffer full capacity $T(t_x)$. $T_{min}$ is the minimum value of $T(t_x)$. $T_{max}$ is the maximum value of $T(t_x)$. If a starting time of data transfer/write monitoring is assumed to be $t_0$, then $T(t_0)=T_i=T_{min}$ is satisfied. And, if a data capacity of the buffer 7, that is, a physical buffer full capacity is assumed to be F, then $T_{max}=F$ is satisfied.

$S(t_x)$ means an amount of write cached data S at a time $t_x$ (an amount of write cached data not written on a disk, an amount of write cached data to which a non-recording flag NC is added in the cache table).

The initial value $T_i$ of the virtual buffer full capacity $T(t_x)$ is set to a half of a physical buffer full capacity F, that is, $T_i=F/2$.

Figure 7:
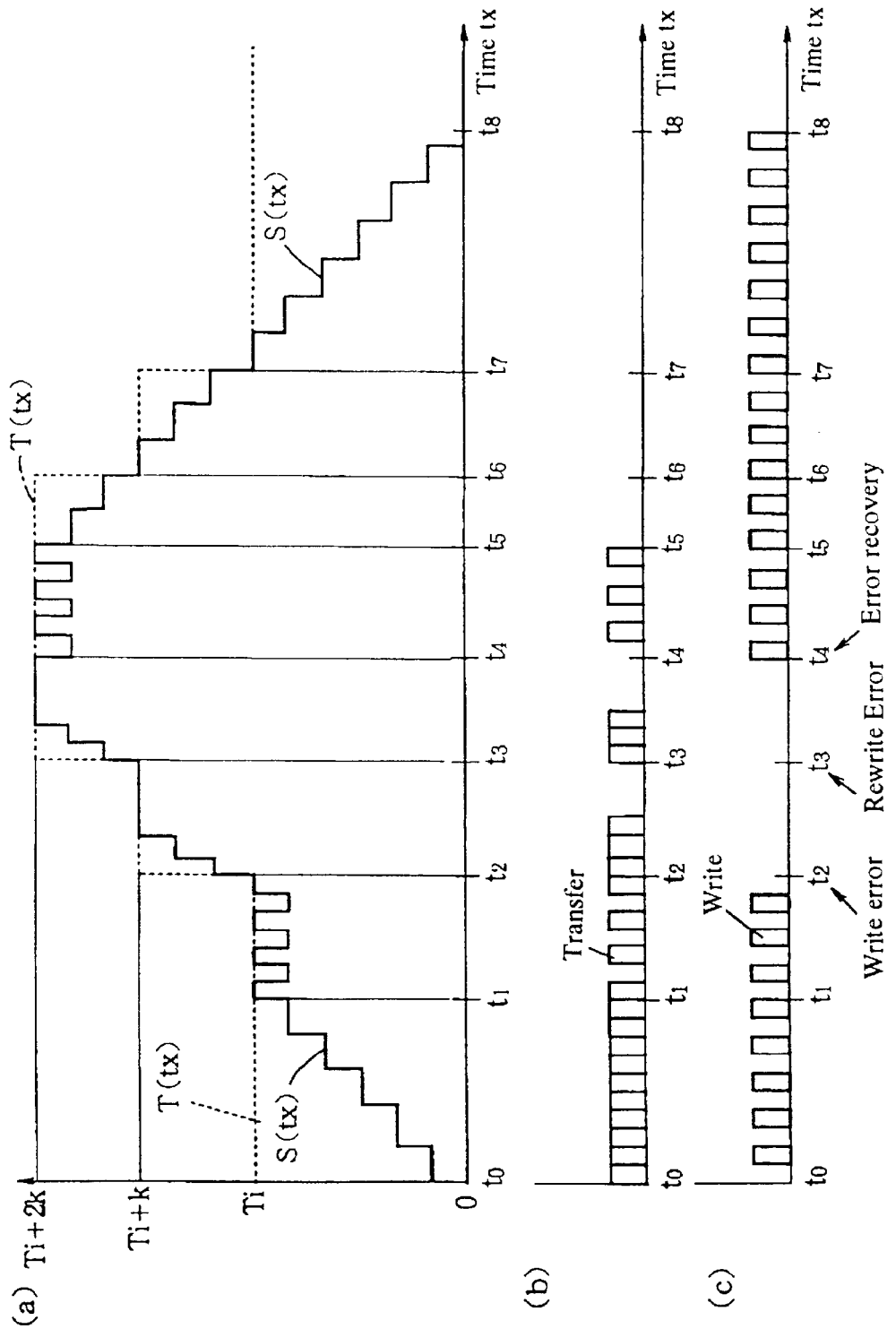
FIG. 7 is a timing chart of a write cache transfer controlling procedure employed for the disk unit in the first embodiment of the present invention.

FIG. 7 is a timing chart of a controlling procedure for write cache transfer of the disk unit 10. However, FIG. 7 shows just an explanatory view of the write cache transfer controlling procedure for easier understanding. FIG. 7(a) shows changes of both amount of write cached data $S(t_x)$ and virtual buffer full capacity $T(t_x)$ with time. FIG. 7(b) shows a buffer input timing of transferred data, which is equivalent to an increment of $S(t_x)$ and FIG. 7(c) shows a buffer output timing of written data on a disk, which is equal to an increment of $S(t_x)$.

In the following description, the host system 20 is premised to transfer a series of data sequentially to the disk unit 10 over the physical buffer full capacity F.

In step S1 shown in FIG. 5, the write cache transfer controller monitors if the host system 20 has transmitted a write command. Receiving a write command, a start logical address of the destination on the disk, and a write data length (the number of unit data items to be transferred) from the host system 20, the controller references to the cache table shown in FIG. 4 so as to search an empty area in the buffer 7. The write cache transfer controller then goes to step S2. The write cache transfer controller, when receiving a write command, starts the data transfer/write monitoring (refer to FIG. 6) if it is stopped (step S7).

In step S3, the write cache transfer controller receives a unit of the first data transferred from the host system 20 and write-caches the data in an empty address in the buffer 7, then updates the logical address field, the R/W flag field, and the recording flag field corresponding to the received data respectively in the cache table. The write cache transfer controller then goes to step S4. The write cache transfer controller can find a logical address used to write each write cached data according to a start logical address received from the host system 20 and the number of unit data items received after a write command. The disk access controller, when the unit of data is write cached, starts the writing of the write cached data on a disk in processings in steps (a) to (h) (step S8).

In step S4, the write cache transfer controller determines if the amount of write cached data $S(t_x)$ does not reach the virtual buffer full capacity $T(t_x)$, that is, if $S(t_x)<T(t_x)$ is satisfied. If $S(t_x)<T(t_x)$ is satisfied, the; write cache transfer controller goes to step S5 immediately. If $S(t_x)=T(t_x)$ is satisfied, that is, if the virtual buffer is full with data, the controller waits until the buffer 7 has an empty address and $S(t_x)<T(t_x)$ is satisfied. The write cache transfer controller then goes to step S5.

In step 5, the write cache transfer controller returns to step S2 and requests the host system 20 for the next data transfer if the number of unit data items received after the write command is less than the data length (the number of unit data items) notified from the host system 20, that is, if the data transfer in response to the write command is not completed yet.

Specifically, the write cache transfer controller, if $S(t_x)<T(t_x)$ is satisfied in steps S2 to S5, requests the host system 20 for the next data transfer immediately after receiving a unit of data is completed. However, if the virtual buffer full $(S(t_x)=T(t_x))$ is satisfied, the controller waits until $S(t_x)<T(t_x)$ is satisfied after completing receiving a unit of data, then requests the next transfer of a unit of data.

The write cache transfer controller loops steps S2 to S5 in such a way, thereby controlling the transfer of a unit of data from the host system 20 and write-caching a unit of transferred data sequentially.

Then, if the number of unit data items received after the write command matches with the data length (the number of unit, data items) notified from the host system 20 in step S5, that is, if the data transfer in response to the write command is completed, then the write cache transfer controller notifies the host system 20 of the completion of the write command, then returns to step S1.

Next, a description will be made of data transfer/write monitoring of the write cache transfer controller with reference to FIGS. 6 and 7.

If $S(t_x)=0$ is satisfied after write cache transfer for a unit of data in response to a write command is completed and the whole write cached data is written on a disk, then the write cache transfer controller starts data transfer/write monitoring upon receiving a new write command, then forms a main loop (steps ST2, ST3, and ST5) and completes the writing of the whole write cached data on a disk. If $S(t_x)$ is satisfied again, the controller ends the data transfer monitoring (step ST9).

If the host system 20 starts the transferring of a series of data and the write cache transfer controller starts data transfer/write monitoring at a time to, $S(t_x)<T(t_x)$ is satisfied for a while. The controller thus notifies the host system 20 of the completion of the receiving immediately after completing receiving of a unit of transferred data. In addition, the disk access controller starts writing write cached data on the object disk (writing on the object medium). To notify the host system 20 of completion of receiving immediately after the completion of the receiving, an increment of the write cached data $S(t_x)$ is larger than a decrement by writing on a disk. Consequently, the amount of write cached data $S(t_x)$ is increased (at $t_0$ to $t_1$ in FIG. 7), then the virtual buffer full $S(t_x)=T(t_x)$ is reached (at $t_1$ in FIG. 7).

In the main loop, step ST5 means a step for determining if the virtual buffer full is reached so as to determine if a disk write error (medium error) must be detected. In step ST5, however, a case that the virtual buffer full is "almost" reached is regarded as virtual buffer full, thereby it is determined if the virtual buffer full is "almost" reached.

After the virtual buffer full $(S(t)=T(t_x))$ is reached, the amount of write cached data $S(t_x)$ is increased/decreased step by step within the virtual buffer full capacity $T(t_x)$ (refer to the times $t_1$ to $t_2$ and $t_4$ to $t_5$ in FIG. 7) so that one sector or several sectors of write cached data is written on the object disk. The virtual buffer full state is canceled. This is why one sector or several sectors of data transferred from the host system 20 is cached in an area emptied due to the disk writing, thereby the virtual buffer full state is set again. A period in which the amount of write cached data $S(t_x)$ is increased/decreased step by step as described above, that is, the virtual buffer is "almost" full is regarded as a continuous virtual buffer full period. And, if the virtual buffer is "almost" full, the write cache transfer controller goes to step ST6, where a media error is detected.

In step ST5, m is defined as an amount of data in several sectors so as to determine a period in which the virtual buffer is "almost" full as a continuous virtual buffer full period. Then, if $S(t_x)>T(t_x)-m$ is satisfied, the write cache transfer controller goes to step ST6, and if $S(t_x)\leq T(t)-m$ is satisfied, the controller returns to step ST2.

In step ST6, the write cache transfer controller determines if a disk write error (media error) occurs. If no error is detected, the controller returns to step ST2. If an error is detected and the writing is stopped, the controller goes to step ST7.

Step ST6 is a step for determining if the virtual buffer full capacity $T(t_x)$ must be reset when a write error occurs. For example, the write error flag is set/reset in the following procedure, then the controller determines whether to return to step ST2 or go to step ST7 according to the write error flag.

The disk access controller, if a write error occurs in a servo sector on a disk as described above, recovers the error in the processings in steps (f) to (h) described above.

Until the first write error detected in a servo sector is recovered in such a way, the write cache transfer controller sets "1" in the write error flag when the first write error occurs, then sets "1" in the write error flag each time another write error occurs in the retry of writing. In addition, during an alternative processing, the controller sets "1" in the write error flag each time the disk is rotated once. And, if a write error occurs in another servo sector in the same track after the above write error is recovered, then the controller sets "1" in the write error flag as described above.

In step ST6, the write cache transfer controller, if "1" is set in the write error flag, resets the flag to "0" and goes to step ST7. If "0" is set in the write error flag in step ST6, the controller returns to step ST2.

Step ST7 is a step for determining if $T_{max}-T(t_x)\geq K$ is satisfied so as to determine if the virtual buffer full capacity $T(t_x)$ can be reset (the value is increased by K) within a range of $T(t_x)\leq T_{max}$.

Step ST8 is a step for resetting $T(t_x)$ to a value increased by K from the current value when the virtual buffer full capacity $T(t_x)$ can be reset.

The above K is an increment/decrement for each resetting of the virtual buffer full capacity $T(t_x)$. For example, it is $T_{max}-T_i=n\times K$ (n: a positive integer).

In step ST7, if $T_{max}-T(t_x)\geq K$ is satisfied, the controller goes to step ST8 and resets the virtual buffer full capacity $T(t_x)$ to a value increased by K (refer to the times $t_2$ and $t_3$ in FIG. 7), then returns to step ST2.

If $T_{max}-T(t_x)<K$ is satisfied in step ST7 (that is, $T(t_x)=T_{max}$), that is, if the buffer becomes full physically, then the controller returns to step ST2. The virtual buffer full capacity $T(t_x)$ is kept as is at this time.

Usually, disk units that handle AV application programs are provided with a buffer 7 having a data capacity (a physical buffer capacity) respectively, which is large enough to avoid $T(t_x)=T_{max}$. However, if a write error occurs frequently or if a series of mass data is received from the host system 20, the buffer 7 may reach $T(t_x)=T_{max}$. In such a case, the write cache transfer is stopped until the write error is recovered and the buffer 7 can generate an empty space.

When the transferring of a series of data from the host system 20 is completed, the amount of write cached data $S(t_x)$ is decreased due to the writing of cached data onto a disk (refer to the times $t_5$ to $t_8$ in FIG. 7), then $S(t_x)<T_i$ is satisfied soon.

In the main loop, step ST3 means a step for determining if $S(t_x)\leq T(t_x)-K$ and $T(t_x)>T_i$ are satisfied so as to determine if the virtual buffer full capacity $T(t_x)$ can be reset within a range of $T(t)\geq T_i$ (the value is decreased by K). And, step ST4 means a step for resetting T(t) to a value decreased by K from the current value when the virtual buffer full capacity $T(t_x)$ can be reset.

If $S(t_x) \leq T(t_x)-K$ and $T(t_x))>T_i$ are satisfied in step ST3, the controller goes to step ST4 and resets the virtual buffer full capacity $T(t_x)$ to the a value decreased by K (refer to times $t_6$ and $t_7$ in FIG. 7), then returns to step ST2.

If $S(t_x)>T(t_x)-K$ or $T(t_x)=T_i$ is satisfied in step ST3, the controller goes to step ST5.

If the amount of write cached data $S(t_x)$ is decreased as the cached data is written on a disk and $S(t_x)<T_i$ is reached, then $T(t_x)$ is reset to $T(t_x)=T_i$ in the processings in steps ST3 and ST4. Then, the amount of write cached data $S(t_x)$ is further decreased as the cached data is written on a disk and $S(t_x)=0$ is reached soon (refer to the time $t_8$)

In the main loop, step ST2 is a step for determining if $S(t_x)=0$ is reached so that the controller determines whether to end data transfer/write monitoring.

If $S(t_x)>0$ is satisfied in step ST2, the controller goes to step ST3. If $S(t_x)=0$ is satisfied in step ST2, the controller goes to step ST9 so as to finish the data transfer monitoring.

In FIG. 7, the controller starts data transfer/write monitoring at to and the buffer full $(S(t_1)=T(t_x))$ is reached at $t_1$. Then, a write error occurs at $t_2$ and the write error occurs again in the retry at $t_3$ and the error is recovered at $t_4$. Then, receiving of a series of transfer data (write caching) is completed at $t_5$ and writing a series of write cached data on a disk is completed at $t_8$.

The write error flag is still reset to "0" at $t_2$, then set to "1" at both $t_2$ and $t_3$. The virtual buffer full capacity $T(t_x)$ is kept at the initial value $T_i$ as is until $t_2$.

Immediately after the write error flag is set at $t_2$, the virtual buffer full capacity $T(t_x)$ is reset to $T_i+K$ from the initial value $T_i$, then the write error flag is reset. Then, immediately after the write error flag is set again at $t_3$, the virtual buffer full capacity $T(t_x)$ is reset further to $T_i+2K$ from $T_i+K$ and the write error flag is reset. After this, the write error flag is kept reset.

At and after $t_5$, the amount of write cached data $S(t_x)$ is decreased. If $S(t_x)=T(t_x)-K(=T_i+K)$ is satisfied at $t_6$, the virtual buffer full capacity $T(t_x)$ is reset to $T_i+K$ from $T_i+2K$. Then, if $S(t_x)=T(t_x)-K(=T_i)$ is satisfied at $t_7$, the virtual buffer full capacity $T(t)$ is reset to the initial value $T_i$ from $T_i+K$.

Each of the write controllers of the conventional disk unit and the disk unit 10 in the first embodiment, if a write error occurs in a servo sector, stops the writing and waits for a disk rotation. Then, the controller retries writing in the error-detected servo sector. Most of write errors are recovered in the first retry of writing.

In the conventional disk unit, data is continuously transferred from the host system until the buffer becomes full with data physically. If the buffer becomes full, data are transferred after the cached data is written on the object disk and the buffer generates an empty space. If a write error occurs after the buffer becomes full physically, therefore, the buffer cannot generate an empty space before the write error is recovered. This is why the host system stops data transfer until the write error is recovered.

In the disk unit 10 in the first embodiment, however, data is continuously transferred from the host system 20 until the virtual buffer becomes full. If the virtual buffer becomes full with data, data retransferred after the cached data is written on the object disk and the buffer 7 generates an empty space. It is thus possible to secure an empty capacity of $T_{max}-T(t_x)$ in the buffer 7 even when a write error occurs after a virtual buffer full state occurs. This is why data can be transferred from the host system 20 before the write error is recovered. And, because the virtual buffer full capacity $T(t_x)$ is increased by a predetermined amount K, transfer of the predetermined amount K of data is enabled while the writing on the disk is stopped.

The predetermined amount K may be set according to the physical buffer full capacity $F(=T_{max})$, a request of the minimum data rate for each application program, and a write data rate set when no write error occurs, etc. For example, the predetermined amount K may be set to an amount of data to be written on a medium, that is, data in a track at the first disk rotation while no write error occurs.

If a write error is recovered in the first retry of writing, data is written in a track at the second disk rotation. If a write error is recovered in the second retry of writing, data is written in a track at the third disk rotation. The conventional disk unit stops writing during a period between when a write error occurs and when the error is recovered, so data can be transferred only in an amount of data equal to a track data capacity from the host system during the second or third disk rotation. However, in the disk unit 10 in the first embodiment, for which the predetermined amount of data K is set to a track data capacity, data equal to 2- or 3-track data capacity can be transferred from the host system 20 during the second or third disk rotation. It is thus possible to avoid degradation of a data transfer rate to be caused by occurrence of a write error.

As described above, the disk unit 10 in the first embodiment can increase the virtual buffer full capacity $T(t_x)$ in units of a predetermined amount K each time a write error occurs. In spite of this, the disk unit 10 cannot still avoid degradation of the data transfer rate if a write error occurs after $T(t_x)=T_{max}$ is satisfied. Generally, however, a disk unit that handles data with use of AV application programs is provided with a buffer having an enough data capacity. And, generally, an AV application program starts transfer of a series of next data a certain time interval after ending the previous transfer of a series of data, thereby write cached data can be written on a disk between those time intervals and the amount of write cached data $S(t_x)$ can thus be reduced.

According to the first embodiment, therefore, because the initial value $T_i$ of the virtual buffer full capacity T is set to F/N (where F is a data capacity of the buffer, and N>1), it is determined if the amount of write cached data S reaches the virtual buffer full capacity T so that write cache transfer is enabled during an S<T period and the write cache transfer is inhibited until S<T is satisfied if a virtual buffer full state (S=T) is set, as well as because the virtual buffer full capacity T is reset to a larger value each time writing of cached data on a disk is stopped while the virtual buffer full state is continued, the minimum value of the data transfer rate can be kept high even when the writing on a disk is stopped.

The disk unit in the second embodiment is obtained by applying the disk unit technique disclosed in Published Unexamined Patent Application No. 6-139715 to the disk unit in the first embodiment. The disk unit disclosed in Published Unexamined Patent Application No. 6-139715 can continue writing at a disk rotation even when a write error occurs in a sector and can retry the writing in the error-detected sector at the next disk rotation.

Specifically, the disk access controller of the disk unit in the first embodiment, if a write error occurs in a servo sector, stops writing at that disk rotation and restarts the writing in the error-detected servo sector at the next disk rotation. However, the disk access controller of the disk unit in this second embodiment continues writing at that disk rotation even when a write error occurs in a servo sector and retries the writing in the error-detected servo sector at the next disk rotation.

More specifically, the disk access controller of the disk unit in this second embodiment writes cached data cyclically and sequentially in target sectors in a target track in the following procedure:

(i) continuing the writing at that disk rotation even when a write error occurs in a sector or in a plurality of servo sectors;

(j) retrying the writing in the error-detected sector or in a plurality of error-detected sectors at the next disk rotation; and (k) reassigning one or a plurality of alternative servo sectors and writes cached data in the reassigned servo sector or in those reassigned servo sectors if there is any servo sector in which the write error cannot be recovered even in the retry of writing.

On the other hand, the write cache transfer controller in the second embodiment sets "1" in the write error flag if the first write error occurs at the first disk rotation for writing, then sets "1" in the write error flag each time a write error occurs in the retry of writing at the next and subsequent disk rotations during a period between when the first write error occurs in a track at the first disk rotation and when all the write errors in that track are recovered. In addition, during an alternative processing, the controller sets "1" in the write error flag each time the disk is rotated once. In this case, the write cache transfer controller in the second embodiment controls write cache transfer in accordance with FIGS. 5 and 6.

If the controller sets "1" in the write error flag as described above, it is possible to avoid degradation of the data transfer rate to be caused by write error occurrence if a predetermined amount K is set to an amount of data in a track just like in the first embodiment.

Furthermore, for example, if a write error occurs in a p servo sectors (p: an integer of 2 or over) in a track respectively and those write errors are recovered in a retry of writing at the next disk rotation, then writing of write cached data in a track is completed at 2×p disk rotations and the virtual buffer full capacity $T(t_x)$ to be increased during this 2×p disk rotations becomes p×K in the first embodiment. On the other hand, in this second embodiment, writing of write cached data in a track is completed within two disk rotations in maximum and the virtual buffer full capacity T(t) to be increased during this p disk rotations becomes K. It is thus possible to suppress the increment of the virtual buffer full capacity $T(t_x)$ to 1/p in the first embodiment.

The write cache transfer controller in the second embodiment may set "1" in the write error flag each time the head passes a servo sector in which no data can be written during a period between when the first write error occurs in a track at the first disk rotation and when all the write errors in the track are recovered. The servo sector in which no data can be written means a servo sector in which both write and rewrite errors occur. It also means a servo sector passed by the head while writing is stopped due to waiting for rewriting or due to an alternative processing. Even in this case, the write cache transfer controller in the second embodiment controls write cache transfer in accordance with FIGS. 5 and 6.

If "1" is set in the write error flag each time the head passes a servo sector in which no data can be written as described above, the predetermined amount K is set to the data capacity of one servo sector, thereby the data transfer rate can be prevented from degradation to be caused by write error occurrence.

For example, in the first embodiment, if a write error occurs in the q-th servo (q: an integer of $1 \leq q \leq Q$) from a writing started servo sector in a track consisting of Q servo sectors (Q: an integer of 2 or over) and this write error is recovered in a retry of writing at the next disk rotation, then writing of write cached data in a track is completed at the second disk rotation and the virtual buffer full capacity $T(t_x)$ increased during this second disk rotation is assumed to become the data amount of one track (=the data capacity of Q servo sectors) On the other hand, in this second embodiment, writing of write cached data in a track is completed at 1+(q/Q) disk rotations and the virtual buffer full capacity $T(t_x)$ increased during this 1+(q/Q) disk rotations is assumed to become the data capacity of the q servo sectors. The increment of the virtual buffer full capacity $T(t_x)$ can thus be suppressed to q/Q of that in the first embodiment.

As described above, therefore, according to the second embodiment, because writing at the current disk rotation is continued regardless of write error occurrence in a servo sector and the writing is retried in the error-detected servo sector at the next disk rotation in the first embodiment, the minimum data transfer rate can be kept high even when disk writing is stopped just like in the first embodiment. In addition, because the disk writing is stopped more shortly than in the first embodiment, an increment of the write cached data to be caused by a disk writing stop can be suppressed lower than that in the first embodiment.

In the first embodiment, if disk writing is stopped due to write error occurrence while the amount of write cached data S reaches the initial value $T_i$ of the virtual buffer full capacity T, the virtual buffer full capacity T is reset to a larger value so as to transfer an amount of the data that could be written on a disk successfully during the write stop. The minimum data transfer rate can thus be kept high. In addition, if the virtual buffer full capacity T is fixed to the initial value $T_i$ and data is transferred at a rate conforming to the disk writing rate while the disk writing is stopped, then the minimum data transfer rate can be kept high even when a write error occurs just like in the first embodiment in which the virtual buffer full capacity T is increased.

The disk unit in the third embodiment can therefore keep the minimum data transfer rate high if data is kept transferred at a predetermined rate conforming to the writing rate while the amount of write cached data S reaches the initial value $T_i$ of the virtual buffer full capacity T whether the disk writing is normal or it is stopped due to write error occurrence.

The write cache transfer controller of the disk unit in the third embodiment controls write cache transfer in the following procedure:

(A) setting the initial value $T_i$ of the virtual buffer full capacity T to F/N (where F is a data capacity of the buffer, and N>1);

(B) determining if the amount of write cached data S (an amount of write cached data not written on a disk) increased by write cache transfer and decreased by writing the cached data on a disk reaches the virtual buffer full capacity $T(T_i)$;

(C) transferring a unit of data continuously and sequentially during an $S<T_i$ period; and (D) transferring a unit of data sequentially at certain time intervals W during an $S \geq T_i$ period.

The steps (C) and (D) are used to keep the minimum data transfer rate high by delaying the data transfer rate (a transfer rate per unit of data or per write command) while the amount of write cached data S reaches the initial value $T_i$ of the virtual buffer full capacity ($S \geq T_i$) more than that while the amount of write cached data S does not reach the initial value $T_i$ of the virtual buffer full capacity ($S<T_i$)

Figure 8:
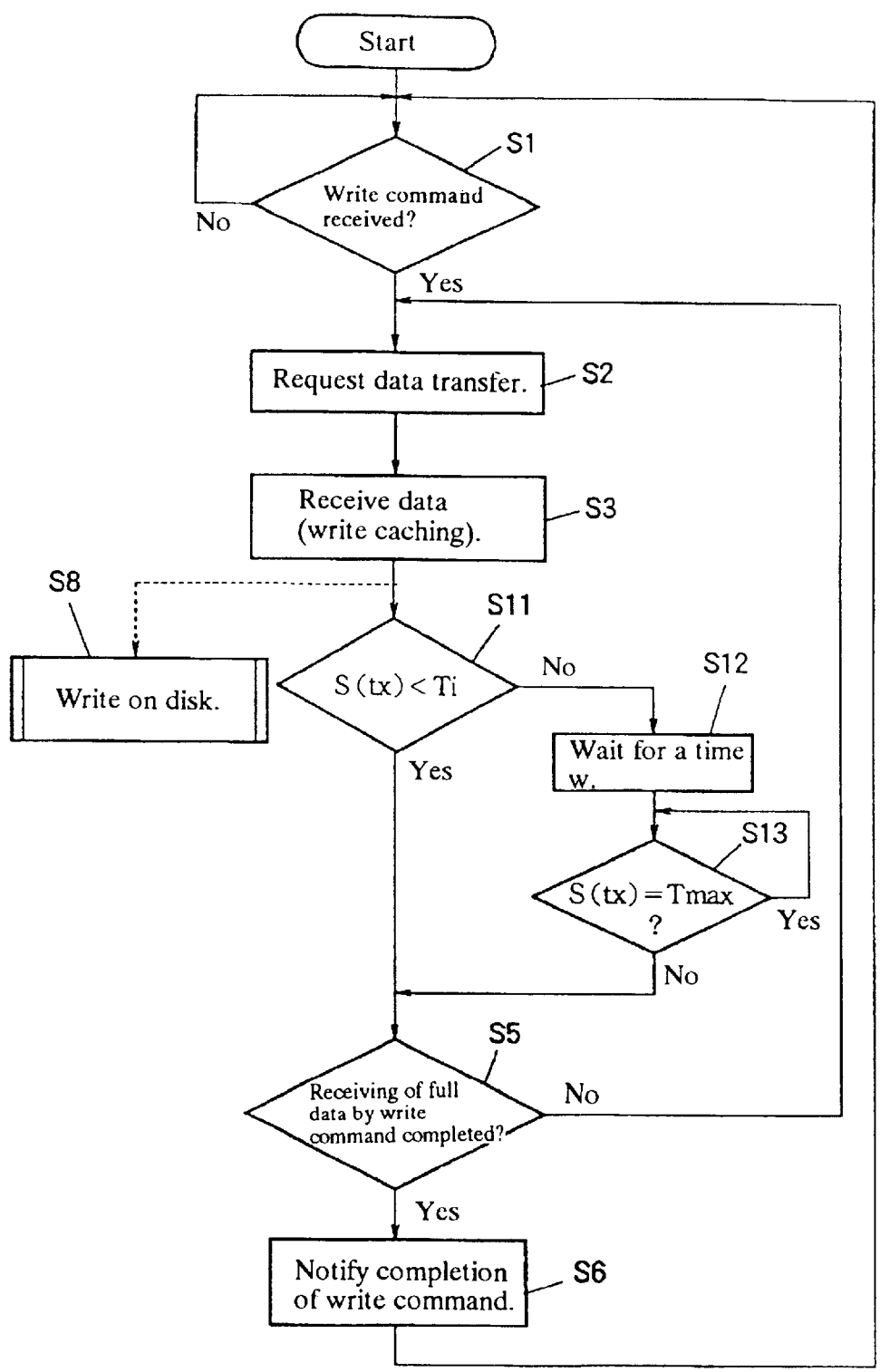
FIG. 8 is a flowchart of a write cache transfer controlling procedure employed for the disk unit in the third embodiment of the present invention.

Hereunder, a description will be made in detail of how the write cache transfer controller of the disk unit in the third embodiment will control write cache transfer. FIG. 8 is a flowchart of a controlling procedure for write cache transfer of the disk unit in the third embodiment for write cache transfer. In FIG. 8, the same numerals are used for the same steps as those in FIG. 5, avoiding redundant description.

Figure 9:
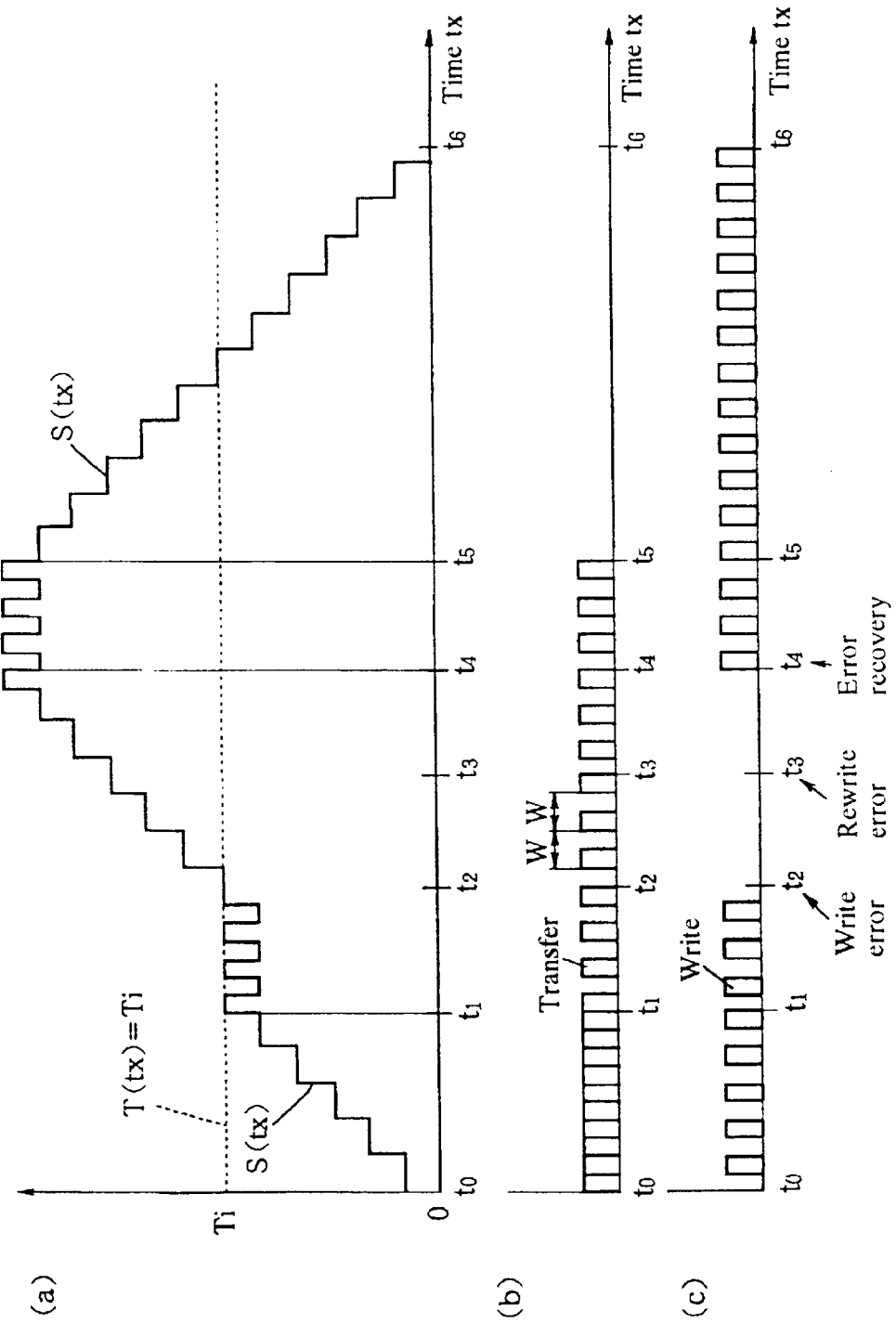
FIG. 9 is a timing chart of a write cache transfer controlling procedure employed for the disk unit in the third embodiment of the present invention.

FIG. 9 is a timing chart of a controlling procedure for write cache transfer of the disk unit in the third embodiment. However, FIG. 9 shows just an explanatory view of the write cache transfer controlling procedure for easier understanding. In FIG. 9, (a) shows the amount of write cached data $S(t_x)$ that is changed with time and (b) shows a buffer input timing of transferred data, which is equivalent to an increment of $S(t_x)$, and (c) shows a buffer output timing of data written on a disk, which is equivalent to an increment of $S(t_x)$.

In the following description, it is premised that the host system transfers a series of data over the physical buffer full capacity $F(=T_{max})$ to the disk unit sequentially.

In step S11 shown in FIG. 8, the write cache transfer controller determines if the amount of write cached data $S(t_x)$ does not reach the virtual buffer full capacity $T(t_x)-T_i$, that is, if $S(t_x)<T_i$ is satisfied. If $S(t_x)<T_i$ is satisfied (YES selected in step S11), the controller goes to step S5 immediately. If $S(t_x) \leq T_i$ is satisfied (NO selected in step S11), the controller waits for a predetermined time w in step S12, then goes to step S13.

In step S13, the write cache transfer controller determines if the amount of write cached data $S(t_x)$ reaches the physical buffer full capacity $T_{max}=F$, that is, if $S(t_x)=T_{max}$ is satisfied. If $S(t_x)<T_{max}$ is satisfied (YES selected in step S13), the controller goes to step S5. In step S5, the write cache transfer controller returns to step S2 if the data transfer by the write command is not completed yet, then requests the host system 20 for the next transfer of a unit of data.

Specifically, the write cache transfer controller completes the receiving of a unit of data if $S(t_x)<T_i$ is satisfied in steps S2, S3, S11 to S13, and S5 and requests the host system 20 for the next transfer of a unit of data immediately. If the virtual buffer full $T_i<S(t_x)$ (however, $S(t_x)<T_{max}$) is satisfied, the write cache transfer controller waits for a predetermined time w to request the host system 20 for the next transfer of a unit of data after completing receiving of a unit of data.

The write cache transfer controller in the third embodiment loops the steps S2, S3, S11 to S13, and S5 in such a way, thereby controlling transfer of a unit of data from the host system and write-caching a unit of transferred data sequentially.

If $S(t_x)=T_{max}$ is satisfied in step S13, the write cache transfer controller waits until $S(t_x)<T_{max}$ is satisfied due to the writing of the cached data on a disk, then goes to step S5. The disk unit, which handles AV application programs, however, is usually provided with a buffer having an enough data capacity (a physical buffer full capacity), so $S(t_x)=T_{max}$ is hardly satisfied.

In FIG. 9, the write cache transfer controller starts data transfer/write monitoring at to, a buffer full ($S(t_1)=T_i$) occurs at $t_1$, a write error occurs at $t_2$, the rewrite error occurs again in the retry at $t_3$, the write error is recovered at $t_4$, receiving of a series of transferred data (write caching) is completed at $t_5$, and writing of a series of write cached data on a disk is completed at $t_6$.

A unit of data is transferred continuously and sequentially between $t_0$ and $t_1$ and between $t_1$ and $t_5$, a unit of data is transferred sequentially at time intervals W. If a time required until the disk unit receives a unit of data from the host system, that is, the time intervals for transferring a unit of data during an $S(t_x)<T_i$ period is assumed to be V, then the time interval W is calculated as W=V+w. (Refer to step S14 in FIG. 8 for this w.)

The host system keeps transferring a unit of data sequentially at time intervals W $t_2$ to $t_4$ even when the disk writing is stopped due to a write error, thereby the amount of write cached data $S(t_x)$ is increased more than the virtual buffer full capacity $T(t_x)=T_i$. At and after $t_5$ when the write cache transfer is completed, the amount of write cached data $S(t_x)$ is decreased and $S(t_x)=0$ at $t_6$ is satisfied.

Because the disk unit in the third embodiment enables the host system to transfer a unit of data at time intervals W if the virtual buffer full capacity ($S(t_x)=T_i$) is reached, an empty space is secured in the buffer 7 when a write error occurs. Consequently, the disk unit enables the host system to transfer data without waiting until the write error is recovered. The host system is thus enabled to transfer a unit of data at the time intervals W even when the disk writing is stopped.

A time interval W for transferring a unit of data as described above, as well as a predetermined time w in FIG. 8 are set as follows, for example. When writing on disk, a long writing stop occurs (writing stop period) due to various factors including a write error and a short writing stop occurs due to a track seek and a head change. Consequently, a disk write rate (a write rate per unit of data) is changed within a certain range even while writing is made normally without any write error, etc. The time interval W is set to an average writing time for a unit of data while the writing is done normally (a track seek period and a head change period are included). The predetermined time w is set to w=W−V (V is time intervals for transferring a unit of data during an $S(t_x)<T_i$ period)

In other words, the time interval W is set so that both increment and decrement of the amount of write cached data $S(t_x)$ are equalized at each of $t_1$ to $t_2$ and $t_4$ to $t_5$ shown in FIG. 9. However, because the time interval W is almost fixed equivalently to the average time for writing a unit of data, there is of course no need to assume synchronization between write cache transfer and disk writing for a unit of data at $t_1$ to $t_2$ and at $t_4$ to $t_5$ shown in FIG. 9.

If a write error is recovered in the first retry of writing, data is written in one track at the second disk rotation. If a write error is recovered at the second retry of writing, data is written in one track at the third disk rotation. In the case of the conventional disk unit, the writing is stopped during a period between when a write error occurs and when the error is recovered and an amount of data equivalent only to a data capacity of one track can be transferred during the second or third disk rotation. However, the disk unit in the third embodiment, which enables a unit of data to be transferred at time intervals W asynchronously with disk writing, enables data equivalent to a data capacity of two or three tracks to be transferred from the host system during the second or third disk rotation. Thus, the disk unit can avoid degradation of the data transfer rate to be caused by write error occurrence.

According to the third embodiment, therefore, the initial value $T_i$ of the virtual buffer full capacity T is set to F/N (F is a data capacity of the buffer, and N>1) and it is determined if the amount of write cached data S reaches the virtual buffer full capacity $T=T_i$ so that a unit of data is transferred continuously and sequentially during an $S/T_i$ period and a unit of data is transferred sequentially at certain time intervals W during an $S \geq T_i$ period, thereby the minimum data transfer rate can be kept high even when the disk writing is stopped, just like in the first embodiment.

As described above, according to the present invention, because the initial value $T_i$ of the virtual buffer full capacity T is set to F/N (where F is a data capacity of the buffer, and N>1) and it is determined if the amount of write cached data S reaches the virtual buffer full capacity T so that the transfer rate of a unit of data is set lower during an $S \geq T_i$ period than during an $S<T_i$ period, thereby the present invention can obtain an effect that the minimum data transfer rate of write cached data is kept high even when the disk writing is stopped.

What is claimed is:

1. A method for controlling write cache transfer to sequentially transfer a unit of data from outside of a storage device to a write cache buffer provided in said storage device that writes write cached data on a recording medium, said method comprising:

setting an initial value, Ti , equal to F/N, where F is a data capacity of the buffer, N>1, said value Ti is an initial value of a value T, and said value T is a full capacity of a virtual buffer;

determining if an amount of write cached data S reaches said virtual buffer full capacity T, said amount S being increased by said write cache transfer and decreased by writing from said write cache to said recording medium;

setting a transfer rate of a unit of data lower while an amount of said write cached data S is not less than said initial value Ti of said virtual buffer full capacity than a transfer rate while an amount of said write cached data S is less than said initial value Ti of said virtual buffer full capacity;

enabling data transfer during a period where said amount of said write cache data S is less than said value T;

in response to said value S being equal to said value T such that said virtual buffer is at said full capacity, inhibiting said data transfer until said value S is less than said value T such that said virtual buffer is no longer full; and resetting said virtual buffer full capacity T to a larger value each time writing of said data transferred from said cache to said storage device is stopped while said virtual buffer remains full.

2. The method according to claim 1, further comprising:

transferring a unit of data sequentially upon a request issued from said storage device to outside said storage device so that a next transfer of a unit of data is requested after a completion of receipt of said unit of data transferred from outside in response to said transfer request;

said enabling further comprising requesting the next transfer of a unit of data immediately after said storage device completes a receipt of said unit of data; and said inhibiting further comprising requesting the next transfer of a unit of data in response to said virtual buffer no longer being full after said storage device completes a receipt of said unit of data.

3. The method according to claim 1, wherein said setting further comprises resetting said virtual buffer full capacity value T to said initial value Ti if said value S becomes less than said value T after said virtual buffer full capacity T is reset to said larger value.

4. The method according to claim 1, wherein said resetting further comprising resetting said virtual buffer full capacity T during a period between when a write error occurs and when said error is recovered so that write cache transfer is enabled for an amount of write data that could be transferred unless said error occurs.

5. The method according to claim 1, wherein said setting further includes the steps of:

transferring a unit of data continuously and sequentially while an amount of write cached data S does not reach said initial value Ti of said virtual buffer full capacity; and transferring a unit of data sequentially at certain time intervals while an amount of said write cached data S is said initial value Ti of said virtual buffer full capacity.

6. The method according to claim 5, further comprising the steps of:

transferring a unit of data sequentially upon a request issued from said storage device to outside said storage device so that the next transfer of a unit of data is requested after a completion of receipt of said unit of data transferred from outside in response to said transfer request;

said enabling further comprising requesting the next transfer of a unit of data immediately after said receipt of said unit of data is completed; and said inhibiting further comprising requesting the next transfer of a unit of data at a certain time interval after said receipt of said unit of data is completed.

7. A disk unit, comprising:

a write cache buffer for storing data transferred from outside of said disk unit;

a write cache transfer controller for controlling write cache transfer for sequentially transferring a unit of data to said buffer from outside of said disk unit, wherein said write cache transfer controller includes:

means for setting an initial value, Ti, equal to F/N, where F is a data capacity of the buffer, N>1, said value Ti is an initial value of a value T, and said value T is a full capacity of a virtual buffer;

means for detecting an amount of write cached data S, which is increased by said write cache transfer and decreased by writing said transferred data on said disk recording medium, and determining if this amount of said write cached data S reaches said buffer full capacity T; and controlling means for delaying a transfer rate of said unit of data more while said amount of write cached data S reaches said initial value Ti of said virtual buffer full capacity ($S^3Ti$) than that while said amount of write cached data S does not reach said initial value Ti of said virtual buffer full capacity (S<Ti), wherein said controlling means includes:

means for enabling said transfer during while said value S is less than said value T, and inhibiting said transfer until said value S is less than said T if said virtual buffer is full (S=T); and means for resetting said virtual buffer full capacity T to a larger value each time writing of write cached data is stopped while said virtual buffer remains full;

a disk recording medium written with write cached data from said buffer;

means for writing said write cached data cyclically in a plurality of sectors in a target track on the surface of said disk recording medium; and a write controller for detecting a position of said writing means on said disk recording medium and positioning said data write device on said target track so as to write said write cached data on said disk recording medium.

8. A disk unit according to claim 7, further comprising:

said write cache transfer means transferring a unit of data sequentially upon a request issued from said disk unit to outside said disk unit so that a next transfer of a unit of data is requested after a completion of receipt of said unit of data transferred from outside said disk unit in response to said transfer request; and said device for enabling or inhibiting said cache transfer requests during the next transfer of a unit of data immediately after a receipt of a unit of data is completed while said value S is less than said value T and requests a unit of next data transfer in response to said value S becoming less than said value T after a receipt of said unit of data is completed if a virtual buffer becomes full with data.

9. The disk unit according to claim 7, wherein said controlling means further includes means for resetting said virtual buffer full capacity T to said initial value Ti in response to said value S becoming less than said value T after said virtual buffer full capacity T is reset to a larger value.

10. A disk unit according to claim 7, further comprising said means for resetting said virtual buffer full capacity T resets said virtual buffer full capacity T so that write cache transfer is enabled for an amount of write data that could be transferred unless a write error occurs during a period between when said write error occurs and when said error is recovered.

11. The disk unit according to claim 10, further comprising said write controlling means stopping writing at a current disk rotation if a write error occurs in a sector and restarts said writing in said error-detected sector at the next disk rotation.

12. The disk unit according to claim 10, further comprising said write controlling means continuing writing at a current disk rotation even when a write error occurs in a sector and retries writing in said error-detected sector at the next disk rotation.

13. The disk unit according to claim 7, wherein said controlling means enables:

a unit of data to be transferred continuously and sequentially while an amount of write cached data S does not reach said initial value Ti of said virtual buffer full capacity; and a unit of data to be transferred at certain time intervals while said amount of write cached data S reaches said initial value Ti of said virtual buffer full capacity.

14. The disk unit according to claim 13, further comprising:

said write cache transfer means transferring a unit of data sequentially by said disk unit so that a unit of data is transferred in response to a request issued from said disk unit to outside said disk unit, then a unit of the next data is transferred in response to another request issued after said disk unit completes receiving a unit of data transferred from outside in response to said request;

said controlling means requests the next data to be transferred immediately after a receipt of said unit of data is completed while said amount of write cached data S does not reach said initial value Ti of said virtual buffer full capacity; and the next data to be transferred at a certain time interval after a receipt of said unit of data is completed while said amount of write cached data S reaches said initial value Ti of said virtual buffer full capacity.

* * * * *

UNITED STATES PATENT AND TRADEMARK OFFICE
CERTIFICATE OF CORRECTION

PATENT NO. : 6,622,206 B1
DATED : September 16, 2003
INVENTOR(S) : Kanamaru et al.

It is certified that error appears in the above-identified patent and that said Letters Patent is hereby corrected as shown below:

Column 10,
Line 59, instead of "step 5," should read -- step S5, --

Column 11,
Line 31, instead of "to" should read -- $t_o$ --
Line 49, instead of "(S(t)" should read -- $(S(t_x)$ --

Column 12,
Line 64, instead of "T(t) ≥T$_i$" should read -- $T(t_x) \geq T_i$ --

Column 13,
Line 1, instead of "T($t_x$))>T$_i$" should read -- $T(t_x) > T_i$ --
Line 20, instead of "to" should read -- $t_o$ --
Line 20, instead of "T($t_x$))" should read -- $T(t_1))$ --

Column 17,
Line 23, instead of "T($t_x$) - T$_i$" should read -- $T(t_x) = T_i$ --
Line 58, instead of "to" should read -- $t_o$ --

Column 20,
Line 2, instead of "further includes the steps of:" should read -- further includes --

Signed and Sealed this

Tenth Day of February, 2004

JON W. DUDAS
*Acting Director of the United States Patent and Trademark Office*